July 22, 1930. T. J. KEENAN 1,771,300
HEADLIGHT
Filed July 10, 1929

Thomas J. Keenan,
INVENTOR
BY Victor J. Evans
ATTORNEY

Patented July 22, 1930

1,771,300

UNITED STATES PATENT OFFICE

THOMAS J. KEENAN, OF STEUBENVILLE, OHIO

HEADLIGHT

Application filed July 10, 1929. Serial No. 377,240.

My present invention has reference to front and rear lamps for automobiles or like motor propelled vehicles. An object is to support front and rear lamps upon the ends of the side frames of an automobile or like vehicle, so that the lamps will be arranged closer to the ground surface than is ordinary and further wherein the lamps have their base portions shaped to represent shock absorbers which will add to the ornamentality of the vehicle.

A still further and important object is the provision in front and rear lamps for an automobile or like vehicle, of supports for said lamps, which shall comprise elements that have their rear portions formed with lugs that are bolted or otherwise rigidly secured to the ends of the side members of the automobile frame and which have their base portions formed with depending eyes or ears that receive therethrough the shackle bolts for the outer ends of the front and rear springs of the vehicle, the said elements being cup-shaped for the reception of the tubular base of lamp housings, and each pair of elements being connected by a cross rod which not only braces the said elements but serve directly as bumpers for the front and rear of the vehicle, or which rods may have connected thereto bumpers of the ordinary construction.

To the attainment of the foregoing the invention consists in the improvement hereinafter described and definitely claimed.

Figure 1:
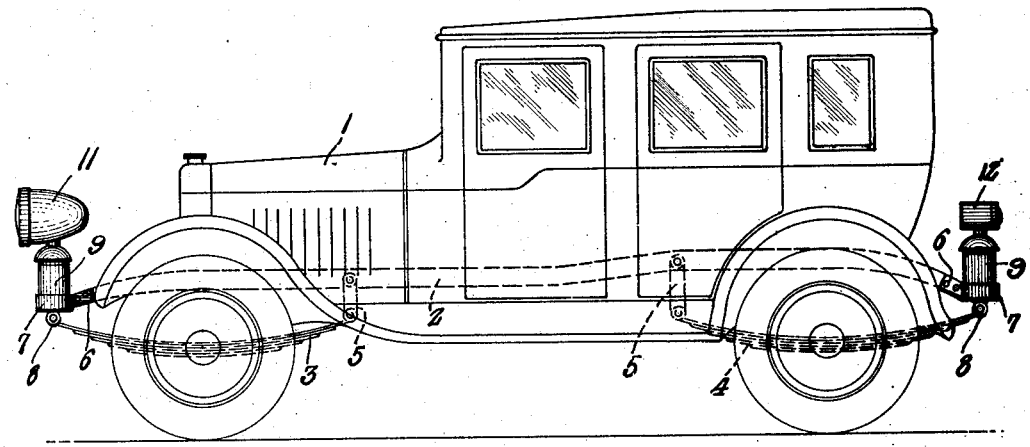
Figure 1 is a side elevation of an automobile equipped with the improvement.
Figure 2:
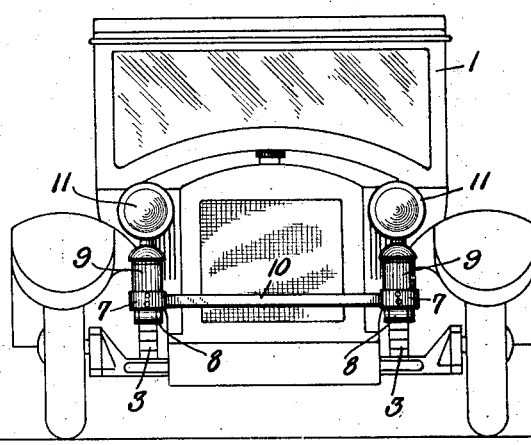
Figure 2 is a front elevation thereof.

A motor driven vehicle such as an ordinary automobile is indicated by the numeral 1, the side members of the body supporting frame by the numeral 2, and the inner shackles for the front and rear springs 3 and 4 by the numerals 5—5.

The frame members 2 have their ends extending a suitable distance beyond the front and rear of the body of the machine and likewise beyond the steering and drive wheels in the usual manner.

The springs 3 and 4 do not have their outer ends directly connected to the side members 2 of the frame as is usual but in the present instance the ends of the frame members 2 have bolted, riveted or otherwise securely fixed on the sides thereof spaced pairs of lugs 6. These lugs are integrally formed on the rear of cup-like elements 7, and the said elements 7 have their closed bottoms provided with spaced ears 8 between which the outer ends of the springs 3 and 4 are received and to which the said ends of the springs are connected by shackle bolts 9. The pairs of elements 7 arranged at the front and rear of the machine are connected by cross brace rods 10, and these rods afford bumpers for both the front and rear of the vehicle.

There is received in and fixed to each of the cup-shaped members 7 the tubular base portions 9', respectively for the front lamp housings 11 and for the rear lamp housings 12. The tubular base portions 9' are shaped to resemble hydraulic shock absorbers and add to the appearance of the vehicle 1. The rays of light from the lamp housings will be directed closer to the ground than is true with the ordinary head and rear lamps for this type of vehicles. The device, as stated, adds to the artistic appearance of the vehicle. The connecting rods 10 for the elements 7 serve as bumpers or may have regular bumpers attached thereto. The connection between the elements 7 and the ends of the springs is strong and rigid and the ears 8 depending from the said elements 7 permit of the front portions of the springs being disposed closer to the ground and tend to lengthen the lives of the said springs without interfering with the resiliency thereof.

Having described the invention, I claim:

1. Front and rear lamps for automobiles, comprising elements fixedly secured to the ends of the side members of the body supporting frame, said elements having depending ears between which the outer ends of the springs of the vehicle are shackeled, and said means providing supports for the base of lamp housings, rods connecting the pairs of elements at the front and rear of the machine and affording bumpers.

2. Front and rear lamps for an automobile comprising cup-like elements having rearwardly extending pairs of lugs to receive therein and to be securely fixed to the ends of the side members of a body supporting frame of the automobile, said cuplike members having depending pairs of ears to receive therebetween the outer ends of the springs of the automobile and to which ears the said ends of the springs are bolted, a rod connected to the front and rear pairs of elements, a tubular base received and fixedly secured in each of said elements and a lamp house on the outer end of each base.

In testimony whereof I affix my signature.

THOMAS J. KEENAN.